T861019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 368

768,948

PROCESS FOR PREPARING SUBSTITUTED HEXENAL ACETALS AND SUBSTITUTED 1,4- AND 1,5-HEXADIENYL ETHERS

Kent C. Brannock, Herman E. Davis and Edward U. Elam, all of P.O. Box 511, Kingsport, Tenn. 37662

Continuation of application Ser. No. 649,122, June 27, 1967. This application Sept. 9, 1968. Published Apr. 8, 1969

Class 260—614

No Drawing. 11 Pages Specification

A process for preparing substituted hexenal acetals and substituted 1,4- and 1,5-hexadienyl ethers from the corresponding 5-oxohexanal acetals by subjecting the 5-oxohexanal acetals to a series of reactions comprising hydrogenation, acylation and pyrolysis, all of which are carried out under alkaline conditions. The products produced by the process are useful as intermediates for the preparation of compounds which in themselves are useful as intermediates for the preparation of valuable products, as for example, vitamin E.